United States Patent Office 3,447,563
Patented June 3, 1969

3,447,563
AUTOMATIC RELEASE VALVES
Arthur W. Simmons and Jack Washbourn, London, England, assignors to Westinghouse Brake and Signal Company, Limited, London, England
Filed Nov. 2, 1965, Ser. No. 506,090
Int. Cl. F16k 31/14
U.S. Cl. 137—495                                    9 Claims

ABSTRACT OF THE DISCLOSURE

An automatic release valve for controlling communication between control reservoir and brake pipe in a brake distributor including a valve element and a valve seat. Spring means cause the valve to open and normal brake pipe pressure causes the valve to close. When control reservoir pressure exceeds brake pipe pressure by a sufficient amount, it will act to keep the valve closed notwithstanding the force of the spring means. A manually operable element is included to open the valve irrespective of the other elements acting on the valve.

---

Figure 1:
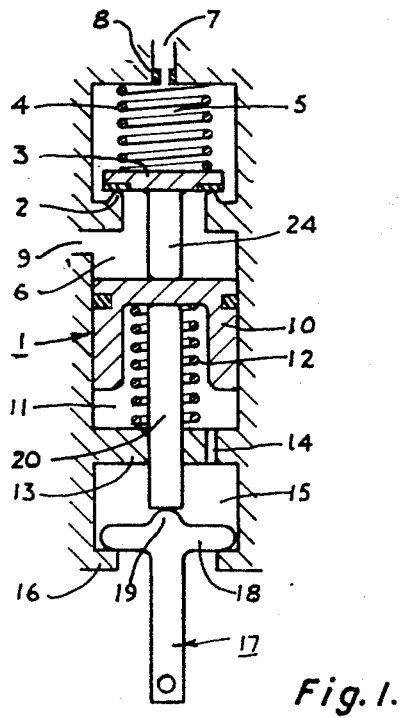

This invention relates to automatic release valves.

In fluid-operated braking systems (for example, railway pneumatically-operated braking systems whether of the type operated by a reduction of a super-atmospheric pressure in a brake pipe or by an increase in a subatmospheric pressure in a brake pipe) having a control reservoir the pressure in which is compared with that in the brake pipe to secure the required degree of braking, there may be provided an automatic release valve by which excessive charging of the control reservoir can be relieved and/or complete discharging of the control reservoir can be secured when the brake pipe pressure is at atmospheric pressure, as for example, when the vehicle concerned has been disconnected after a brake application has been made.

The present invention provides an automatic release valve having a valve element movable out of and into engagement with a valve seat whereby communication is permitted and prevented respectively between, in operation of the valve, a control reservoir and a brake pipe, first means effective resiliently to urge the valve element out of engagement with the valve seat, second means subjectable to pressure dependent on the pressure in the brake pipe and effective upon the brake pipe being at its normal fully-charged pressure to render the first means ineffective, and third means manually operable to move the valve element out of engagement with the valve seat irrespective of the effectiveness or otherwise of the first and second means.

With such an arrangment, manual operation of the third means in the event of the control reservoir being overcharged will, by the movement of the valve element out of engagement with its valve seat, put the control reservoir in communication with the brake pipe to secure equalisation of pressure between the control reservoir and the brake pipe. Also, manual operation of the third means in the event of the brake pipe being at atmospheric pressure will likewise put the control reservoir in communication with the brake pipe so that the control reservoir pressure can be brought also to atmospheric pressure. In this latter operation, the third means need only be operated to a degree and for a length of time sufficient to move the valve element off the valve seat for, thereafter, the valve element will be held out of engagement with the valve seat by the first means which will not be rendered ineffective by the second means as the brake pipe pressure is below its normal fully-charged pressure.

The second means may comprise a member arranged to be subjected to opposing forces of which one is generated by a pressure dependent upon the pressure pertaining in the brake pipe and the other is generated by the first means.

The member may be mounted either below or above the valve element. The term "below" is herein to be understood to mean on the side oft he valve element to which the application of pressure tends to move the valve element out of engagement with the valve seat and the term "above" is herein to be understood to mean on the side of the valve element to which the application of pressure tends to move the valve element into engagement with the valve seat.

In the first of the above mentioned alternative arrangements, the first means may comprise two springs arranged to act in opposition to each other, the first (and the weaker) of the two springs being effective resiliently to urge the valve element into engagement with the valve seat and the second (and the stronger) of the two springs being effective resiliently to urge the valve element out of engagement with the valve seat through the medium of the member. In this arrangement, upon the brake pipe being at its normal fully-charged pressure, by the rendering ineffective of the first means the valve element will be moved into engagement with the valve seat by the second means which will have been rendered effective by the first means having been rendered ineffective by the second means. The third means may, in this case, be arranged to move the valve element through the medium of the member.

In the second of the above mentioned alternative arrangements, the first means may comprise a first spring operative directly on to the member and a second spring operative directly on the valve element and therethrough also on the member. In this arrangement, upon the brake pipe being at its normal fully-charged pressure, the second means will of itself move the valve element into engagement with the valve seat. The third means, in this case, may be arranged to move the valve element directly.

In either of the above mentioned alternative arrangements, the third means may comprise a pivotally mounted handle connected to an operating member guided fot linear movement which movement is secured by pivotal movement of the handle.

Whilst the pressure to which the second means is subjectable may not be the actual brake pipe pressure it is preferably so.

The member may be constituted by a diaphragm or piston.

Figure 2:
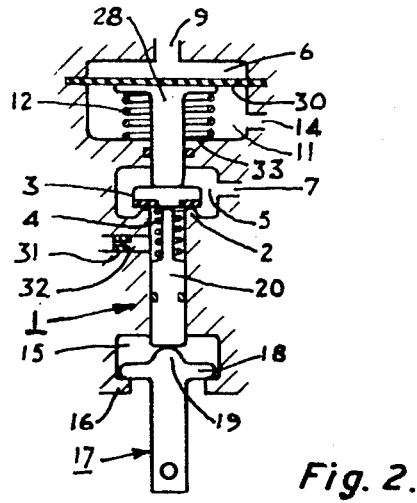

Embodiments of the present invention will now be described in greater detail, by way of example only, with reference to the accompanying drawings of which:

FIG. 1 is a diagrammatic representation of one form of automatic release valve, and FIG. 2 is a diagrammatic representation of an alternative form of valve.

In the construction of FIG. 1, the valve comprises a casing 1 in which is located a valve seat 2 moveable into and out of engagement with which is a co-operating valve element 3. The valve element 3 is provided with a stem 24 and is resiliently urged into engagement with the valve seat 2 by a spring 4. The valve element controls communication between a chamber 5 above the element 3 and a chamber 6 below the valve element 3.

The chamber 5 has communicating with it a conduit 7 in which is located a choke 8.

The chamber 6 has communicating with it a conduit 9 and has axially slidable within it a piston 10 abutted on its upper surface by the stem 24 of the valve element 3. This piston 10 serves to separate the chamber 6 from a chamber 11 below the piston 10. Within this chamber 11 is a spring 12 effective on the piston 10 resiliently to urge it upwardly as viewed in the drawing, the spring 12 extending between the underside of the piston 10 and a wall 13 extending across the casing 1.

The wall 13 has therethrough a passage 14 which provides atmospheric connection to the chamber 11 via a chamber 15 on the underside (as viewed in the drawing) of wall 13.

The lower end of chamber 15 is provided with an internally extending flange 16 which serves to retain within the chamber 15 without sealing the chamber 15 from atmosphere, a manually operable handle 17 having a flange 18 which engages with the flange 16 on the casing 1. Abutting a central protrusion 19 on the handle 17 is one end of a member or rod 20 the other end of which abuts the underside of the piston 10.

In use, the above described valve is connected into a railway pneumatically operated braking system (not shown) with the conduit 7 connected to the control reservoir of the system and the conduit 9 to the brake pipe of the system through the brake pipe chamber in the distributor of the system.

With such connection, first means (the two springs 4 and 12 which are acting in opposition on the valve element 3) will resiliently urge the valve element 3 out of engagement with the valve seat 2 as the force exerted upwardly (as viewed in the drawing) by the spring 12 exceeds by a substantial amount the force exerted downwards (as viewed in the drawing) by the spring 4. The resultant differential force exerted upwardly on the valve element 3 is opposed by the downwardly exerted force due to brake pipe pressure effective in the chamber 6 and on the piston 10 (second means). The value of the resultant differential force exerted by the first means is such that this force is equalled (and subsequently overcome) when the pressure prevailing in the chamber 6 approaches that prevailing in the brake pipe when it is normally fully charged.

Let it now be assumed that the valve of FIG. 1 is connected into a braking system in the manner above described and that the system is completely empty. In this condition, the pressure in chamber 6 being at atmosphere the differential force exerted by the first means (springs 4 and 12) will resiliently hold the valve element 3 away from the seat 2. As charging of the system commences, air will flow into the chamber 6 and from thence past the seat 2 and element 3 into chamber 5 from where it will flow through the choke 8 and conduit 7 to the control reservoir (not shown). Air will also flow to the control reservoir through an alternative path in the distributor (also not shown).

As the pressure of the air builds up in the system, the pressure in chamber 6 likewise builds up until, when that pressure approaches the normal fully-charged pressure of the brake pipe, the pressure exerted on the piston 10 will cause the generation of a force by the piston 10 sufficient to overcome the differential force exerted by the two springs 4 and 12. In this condition, the piston 10 will move downwardly (rendering ineffective the first means) and thus permit the valve element 3 to be moved into engagement with the valve seat 2. Further charging of the control reservoir (not shown) will, however, continue through the alternative path above mentioned.

Charging of the system now continues until the brake pipe pressure has reached the normal fully-charged value.

Should it occur that, at any time, the control reservoir becomes charged to a pressure in excess of that of the brake pipe, equalisation of these pressures can be restored by operation of the handle 17 (the third means).

Pulling the free end of the handle 17 in any horizontal direction causes the handle 17 to pivot about the abutment of the flange 18 on the handle 17 with the flange 16. Such pivoting of the handle 17 lifts upwardly the protrusion 19 on the handle 17 and thereby lifts the member 20. This movement, through the piston 10 and the stem 4 lifts the valve element 3 out of engagement with the valve seat 2 thus providing intercommunication between the two chambers 5 and 6 and, therefore, intercommunication between the control reservoir and brake pipe. Consequently any excess of pressure in the control reservoir is dissipated into the brake pipe. After such equalisation, the original condition of the valve is restored merely by releasing the handle 17 which will then be returned to its position shown by the springs 4 and 12.

When a brake application is made this is achieved by reducing the brake pipe pressure relative to the control reservoir pressure and the brakes can only subsequently be released by restoring the equality of these two pressures. Consequently, if one of the vehicles forming the train is separated from the remainder of the train, the brakes will continue to be applied after such separation as the brake pipe of that separated vehicle will be at atmospheric pressure. It is now necessary, therefore, in order to be able to move the separated vehicle, to reduce the control reservoir pressure to atmospheric pressure to release the brakes.

This, again, is achieved in the valve above described by pulling the free end of the handle 17 in a horizontal direction.

Prior to such operation, the valve element 3 will have been held in engagement with the valve seat 2 against the effort of the first means by the control reservoir pressure prevailing in chamber 5 acting on the top side of the element 3. However, by such operation of the handle 17, the valve element 3 will be lifted out of engagement with the seat 2 against the effort exerted by the air pressure in chamber 6. Moreover, once the valve element 3 has been so lifted, it will be retained in this position by the difference in force exerted by the springs 12 and 4 as the pressures above and below the valve element 3 will be effectively equalised by the opening of the valve.

As a result, it will be seen that, unlike some hitherto proposed release valves, it is not necessary for the operator to hold the handle 17 in its pivoted position during the whole of the discharge of the control reservoir; he merely has to pull the handle 17 a distance sufficient to move the element 3 out of engagement with the seat 2, the valve element 3 then being retained in that position by the first means.

The purpose of the choke 8 is to prevent an inrush of air from the control reservoir to the chamber 6 (via chamber 5) so raising the pressure in chamber 6 temporarily as to move the piston 10 downwardly to allow premature reseating of the valve element 3 on the seat 2.

In the construction of FIG. 2, the valve comprises a casing 1 in which is located a valve seat 2 movable into and out of engagement with which is a co-operating valve element 3. The valve element 3 is resiliently urged out of engagement with the valve seat 2 by a spring 4. The valve element controls communication between a chamber 5 above the element 3 and the brake pipe via a choke 31 mounted in a conduit 32, below the valve element 3 as viewed in the figure.

The chamber 5 has communicating with it a conduit 7.

Abutting the upper face of the valve element 3 is a stem 28 integral with a diaphragm follower connected to a diaphragm 30. The diaphragm 30 defines a chamber 11 in which chamber is mounted a spring 12. The spring 12 being effective on the diaphragm 30 resiliently to urge it upwardly as viewed in the drawing; the spring 12 extending between the underside of the diaphragm follower and a wall 33 extending across the casing 1. The chamber 11 is in permanent communication with the atmosphere via a passage 14.

Above the diaphragm 30 is a chamber 6 communicating with a conduit 9.

Beneath the valve element 3 (as viewed in the drawing) and in abutment therewith is one end of a rod 20 the opposite end of which abuts a manually operable handle 17 at a central protrusion 19 of the handle. The handle 17 has a flange 18 which engages with a flange 16 of the casing, thereby defining a chamber 15, which chamber is permanently retained at atmospheric pressure as the flanges 16 and 18 do not seal together.

In use, the valve described in FIG. 2 is connected into a railway pneumatically-operated braking system (not shown) with the conduit 7 connected to the control reservoir of the system and the conduits 9 and 32 connected to the brake pipe of the system through the brake pipe chamber in the distributor of the system.

The various operations of this valve are similar to those for the valve in FIG. 1 except for the following points:

(1) When the system is completely empty, as the pressure in the brake pipe is increased the diaphragm 30 which is held away from the valve element 3 by the spring 12, is formed downwards (as viewed in the drawing) against the spring 12 to seat the valve element 3 on its seat 2, against the spring 4 which is tending to hold the valve element 3 off its seat. Thus springs 4 and 12 which constitute the first means, instead of acting in opposition to each other through the valve element 3 (as in FIG. 1), act in concert against the pressure prevailing in chamber 6 when the valve element 3 is seated, and spring 12 urges the diaphragm 30 upwardly if there is insufficient pressure in chamber 6 to overcome springs 12, and thus permits the valve 3 to be urged upwardly as viewed in the drawing, by spring 4 (assuming that chamber 5 is at atmospheric pressure, if not, valve element 3 will remain seated).

Hence it can be seen that upon charging, communication between the control reservoir and brake pipe is maintained until the pressure in the brake pipe approaches its normal fully-charged value.

In the event of overcharging the control reservoir, the operation is the same as that for FIG. 1.

(2) In the event of de-coupling vehicles when the brake pipe is at atmospheric pressure, in order to vent the control reservoir to atmosphere so as to release the brakes, manual operation of the handle 17 in the way described, is necessary.

As, in this situation, the chamber 6 is at atmospheric pressure (being connected to the brake pipe), spring 12' will be free, and will, in fact, lift the diaphragm 30 so that the stem 28 is lifted clear of the valve element 3. However, until the handle 17 is operated, the valve element 3 will continue to be engaged with the valve seat 2 due to the pressure in chamber 5 overcoming the force exerted by spring 4. Upon operation of the handle 17 (in a manner identical to that of FIG. 1), the valve element 3 will be moved out of engagement with the valve seat 2 and will be retained in the disengaged position by the spring 4 as the pressure across the valve element 3 is now equalised.

Again, the choke 31 (like the choke 8) prevents any premature re-seating of the valve element 3 on the seat 2 by preventing a sudden in-rush of air which might otherwise cause the rod 20 to move downwardly thus resulting in such premature re-seating of the valve element 3.

Having thus described our invention what we claim is:

1. An automatic release valve having a valve element moveable out of and into engagement with a valve seat whereby communication is permitted and prevented respectively between, in operation of the valve, a control reservoir and a brake pipe, first means effective resiliently to urge the valve element out of engagement with the valve seat, said first means comprising spring means acting to urge the valve element out of engagement with the valve seat, the surface area of the valve element facing away from the valve seat being of such size that when the brake pipe pressure is substantially less than the control reservoir pressure the force of the control reservoir pressure acting on the said surface will exceed the force of the spring means by a sufficient amount so that the valve element will be held closed against the seat, second means subjectable to pressure dependent upon the pressure in the brake pipe and effective upon the brake pipe being at its normal fully-charged pressure to render the first means ineffective, and third means for positively moving the valve element out of engagement with the valve seat independently of the spring means.

2. An automatic release valve as claimed in claim 1, wherein the second means comprises a member arranged to be subjected to opposing forces of which one is generated by a pressure dependent upon the pressure pertaining in the brake pipe and the other is generated by the first means.

3. An automatic release valve as claimed in claim 2, wherein the member is mounted below the valve element and the spring means comprises two springs arranged to act in opposition to each other, the first (and the weaker) of the two springs being effective resiliently to urge the valve element into engagement with the valve seat and the second (and the stronger) of the two springs being effective resiliently to urge the valve element out of engagement with the valve seat through the medium of the member.

4. An automatic release valve as claimed in claim 3, wherein the third means is arranged to move the valve element through the medium of the member.

5. An automatic release valve as claimed in claim 2, wherein the member is mounted above the valve element and the spring means comprises a first spring operative directly on to the member and a second spring operative directly on to the valve element and therethrough also on the member.

6. An automatic release valve as claimed in claim 5, wherein the third means is arranged to move the valve element directly.

7. An automatic release valve as claimed in claim 1, wherein the third means comprises a pivotally mounted handle connected to an operating member guided for linear movement which movement is secured by pivotal movement of the handle.

8. An automatic release valve as claimed in claim 1, wherein the pressure to which the second means is subjectable is the brake pipe pressure.

9. An automatic release valve as claimed in claim 1 wherein the member is constituted by a diaphragm.

References Cited

UNITED STATES PATENTS

| | | | |
|---|---|---|---|
| 1,361,636 | 12/1920 | Stage | 137—505.42 X |
| 2,868,224 | 1/1959 | Karlsson | 137—505.42 X |

ARNOLD ROSENTHAL, *Primary Examiner.*